United States Patent [19]

Izukawa

[11] Patent Number: 5,742,856
[45] Date of Patent: Apr. 21, 1998

[54] CAMERA HAVING MAGNETIC RECORDING HEAD

[75] Inventor: Kazuhiro Izukawa, Saitama-ken, Japan

[73] Assignee: Canon Kabushiki Kaisha, Tokyo, Japan

[21] Appl. No.: 731,996

[22] Filed: Oct. 22, 1996

Related U.S. Application Data

[63] Continuation of Ser. No. 420,497, Apr. 12, 1995, abandoned.

[30] Foreign Application Priority Data

Apr. 28, 1994 [JP] Japan ................................. 6-111740

[51] Int. Cl.$^6$ ........................... G03B 17/24; G03B 1/04
[52] U.S. Cl. .................................. 396/319; 360/3
[58] Field of Search ........................... 396/319, 320; 360/1, 3, 66

[56] References Cited

U.S. PATENT DOCUMENTS

| | | | |
|---|---|---|---|
| 4,851,936 | 7/1989 | Soga | 360/66 |
| 4,862,294 | 8/1989 | Mihara et al. | 360/66 |
| 5,247,321 | 9/1993 | Kazami | 354/106 |
| 5,281,987 | 1/1994 | Nagata | 354/105 |
| 5,325,138 | 6/1994 | Nagata | 354/106 |
| 5,335,029 | 8/1994 | Itoh et al. | 354/106 |
| 5,479,228 | 12/1995 | Tamamura et al. | 354/106 |

FOREIGN PATENT DOCUMENTS

| | | |
|---|---|---|
| 0466488 | 1/1992 | European Pat. Off. . |
| 0483844 | 6/1992 | European Pat. Off. . |
| 5134307 | 5/1993 | Japan . |
| 6095234 | 8/1994 | Japan . |

*Primary Examiner*—A. A. Mathews
*Attorney, Agent, or Firm*—Robin, Blecker, Daley and Driscoll

[57] ABSTRACT

A camera of the kind having a magnetic head for magnetically recording data in a track part of each frame portion of a film is arranged such that, in re-recording information in the track part having a previous record of data, a predetermined signal for erasing information is supplied to the head during a period other than a period during which a data signal is supplied to the head, so that new data can be recorded by completely erasing, without fail, the previous record of data in carrying out the re-recording.

28 Claims, 13 Drawing Sheets

F I G. 13 (a)
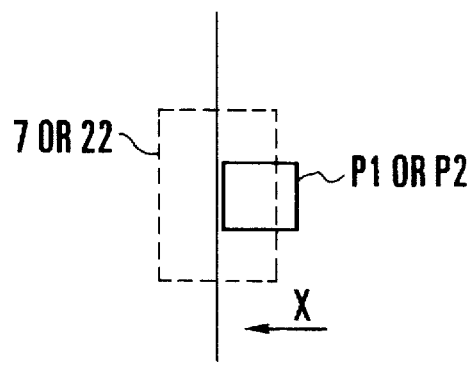
F I G. 13 (b)
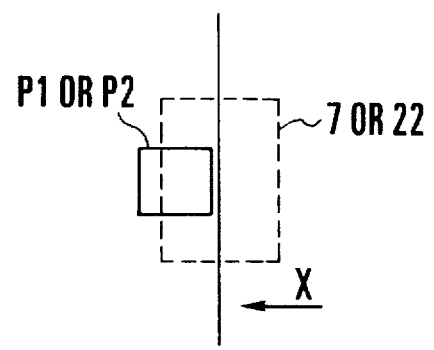

CAMERA HAVING MAGNETIC RECORDING HEAD

This is a continuation application under 37 CFR 1.62 of prior application Ser. No. 08/420,497, filed Apr. 12, 1995, now abandoned.

BACKGROUND OF THE INVENTION

1. Field of the Invention

This invention relates to a camera provided with a magnetic head for recording information in a magnetic recording part of a film.

2. Description of the Related Art

A camera arranged to be capable of magnetically recording information about photographing, such as a shooting mode, a number of copies to be printed, a shutter speed, an aperture value, etc., in a magnetic recording part which is provided on a film, has been disclosed, for example, in U.S. Pat. No. 4,864,332. The arrangement of the camera is such that the film on which the magnetic recording has been made is processed by a developing machine to reproduce the record of magnetic information of the varied kinds from the magnetic recording part, and then pictures are printed in accordance with the magnetic information reproduced.

However, the camera of this kind has presented a problem that, if a shot is taken on the assumption that the camera is in a normal shooting mode while it is in actuality in the panorama shooting mode, the magnetic information recorded in the magnetic recording part cannot be modified even if the mode setting is found wrong after shooting. Besides, if the number of copies to be printed is set by mistake, too many copies of pictures would be printed.

In view of the problem, a magnetic recordable camera has been developed to permit, before printing, easy modification of the magnetic information recorded in the magnetic recording part of a film, as disclosed in Japanese Laid-Open Patent Application No. HEI 5-115611. This camera uses an erasing head for erasing recorded information before modifying it. The use of the erasing head, however, causes an increase in cost of the camera.

Meanwhile, it has been considered to be possible to erase unnecessary information by using, instead of the erasing head mentioned above, a magnetic recording head which is provided for recording information in the magnetic recording part, to scan recorded information with a DC signal or a sync (synchronizing) signal allowed to flow to the magnetic recording head. However, the use of the recording head for this purpose has required some facility to ensure complete erasure of any unnecessary record of information. A failure to accurately erase the existing unnecessary information before re-recording of modified information would leave unnecessary information mixed in the modified information to cause a developing machine to make erroneous reproduction.

SUMMARY OF THE INVENTION

It is one aspect of the invention under the present application to provide a camera wherein, in recording data in a magnetic recording part of each frame on a film with a head, a predetermined signal which differs from a data signal is supplied to the head during a period other than a period of supplying the data signal to the head, in such a way as to ensure complete erasure of previously recorded data even in a case where data is to be re-recorded for the same frame after data is first recorded in the magnetic recording part.

It is another aspect of the invention to provide a camera arranged, for attaining what is mentioned above, to supply a data signal to a head in recording data for the first time, and to supply a data signal and a predetermined erasing signal to the head in a time sharing manner in the event of performing re-recording of data.

The above and other aspects and features of the invention will become apparent from the following detailed description of embodiments thereof taken in connection with the accompanying drawings.

BRIEF DESCRIPTION OF THE DRAWINGS

FIGS. 13(a) and 13(b) show how the action of each of the embodiments of the invention is carried out.

DETAILED DESCRIPTION OF THE PREFERRED EMBODIMENTS

Figure 1:
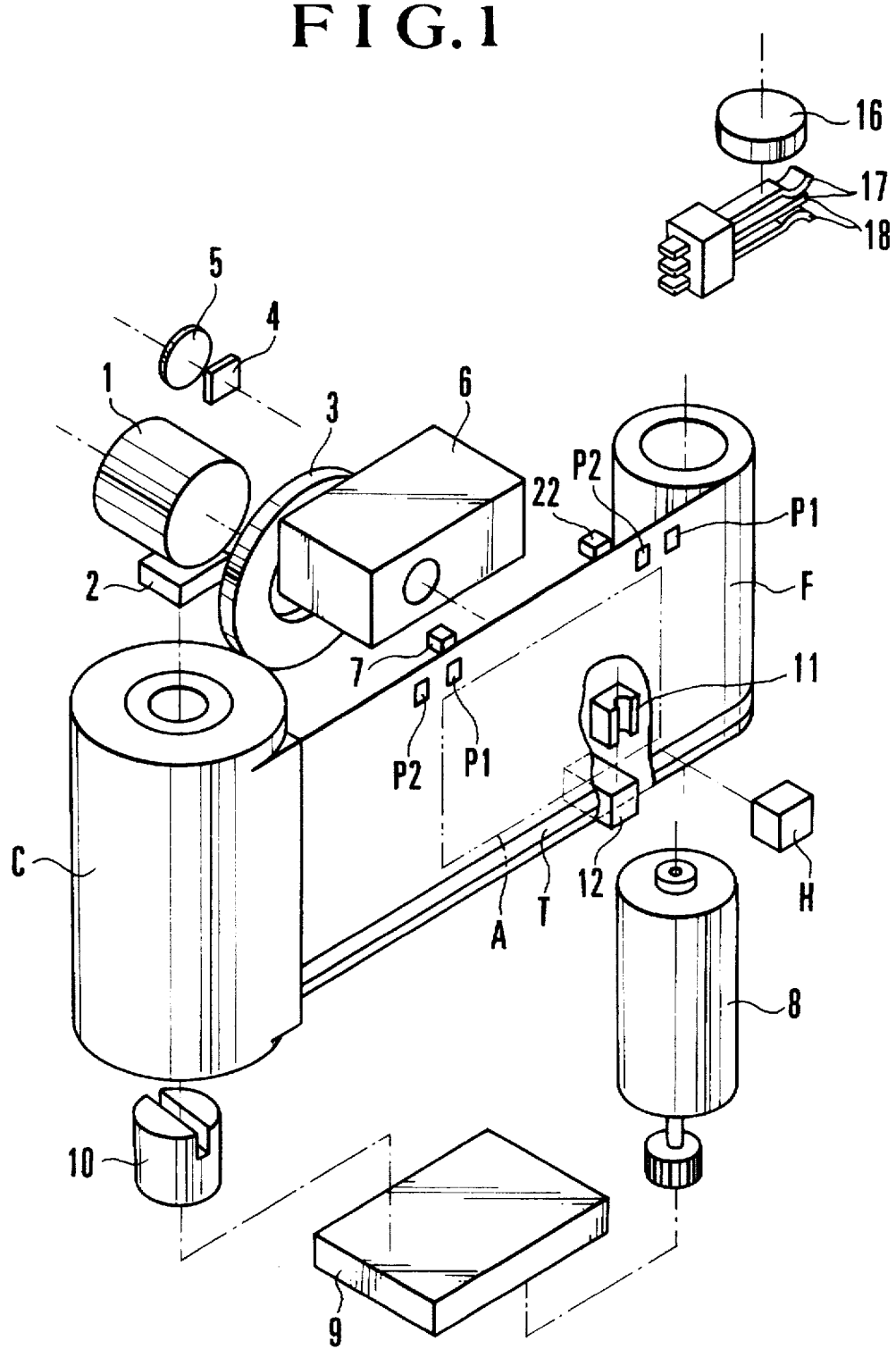
FIG. 1 is an oblique view showing a mechanical arrangement of essential parts of a camera which is arranged as a first embodiment of the invention.

A first embodiment of the invention is described below with reference to FIGS. 1 to 8, wherein FIG. 1 shows in an oblique view the internal structural arrangement of essential parts of a camera which is arranged according to the invention as the first embodiment thereof. The camera is provided with a photo-taking lens 1, a block 2 which includes a lens actuator 2a arranged to drive the photo-taking lens 1 and a lens encoder 2b arranged to generate signals indicating a lens position, a lens shutter 3, a light measuring sensor 4 which is provided for an AE (automatic exposure), and a lens 5 which is arranged to determine the light receiving angle of the light measuring sensor 4. A block 6 includes a distance measuring sensor 6a and a viewfinder. A photo-reflector 7 is arranged to detect perforations P1 and P2 provided in a film F and to generate a signal for indexing each frame on the film F and a signal for indicating timing of the end of recording information. A film transport motor 8 is disposed within a takeup spool. A gear train 9 is provided for speed reduction and switching between film winding and rewinding. A fork 10 is provided for film rewinding.

A film cartridge C contains the film F therein with the fore end of the film in a pulled-out state. The film F is provided with a magnetic recording part T (which may be called a magnetic track) and the above-stated perforations P1 and P2 which define shooting picture planes A. A magnetic head H is arranged to record information in the magnetic track T on the film F and to reproduce the information from the magnetic track T. A pad 11 is arranged to push the film F against the magnetic head H and is provided with a recessed part in its middle part for enhancing the tightly sticking power of a head gap between the magnetic head H and the film F. A pad back-and-forth moving mechanism 12 is arranged to sandwich the film F and to push the pad 11 at a predetermined amount of pressure against the film F only when the film F is in process of being transported. The camera is further provided with a release button 16. A switch 17 (or SW1) is arranged to be turned on by the first stroke of the release button 16 to cause a light measuring action and a distance measuring action to begin. A switch 18 (or SW2) is arranged to be turned on by the second stroke of the release button 16 to cause a sequence of shutter opening and film transport actions to begin. A photo-reflector 22 is arranged to detect the perforations P1 and P2 of the film F and to generate a signal for determining a recording frequency of the magnetic head H and a signal for indicating the start of recording information.

Figure 2:
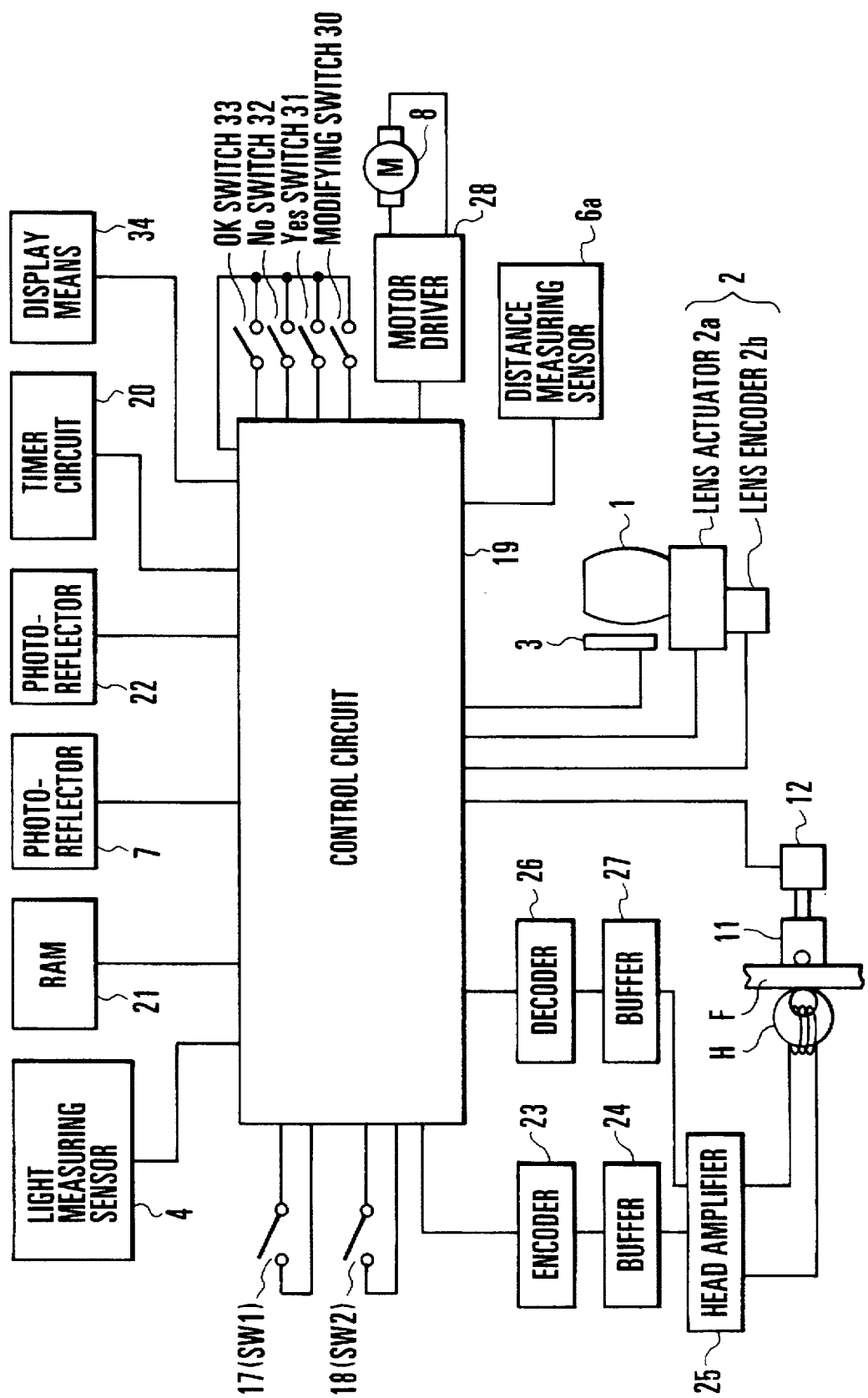
FIG. 2 is a block diagram showing an electrical arrangement of the camera of FIG. 1.

FIG. 2 is a block diagram showing the circuit arrangement of essential parts of the camera. Referring to FIG. 2, a control circuit 19 is arranged to control various actions of the camera. A timer circuit 20 is arranged in a known manner. A RAM 21 is arranged to store photographic information such as an aperture value, a shutter time, etc. The circuit arrangement further includes an encoder 23, a buffer 24, a head amplifier 25, a decoder 26, a buffer 27 and a motor driver 28 which is arranged to drive the film transport motor 8. A modifying switch 30 is arranged to be used when the camera operator wishes to change data such as a number of copies to be printed, printing format, etc., after photographing. The camera is provided further with a Yes switch 31, a No switch 32, an OK switch 33 and a display means 34.

Figure 3:
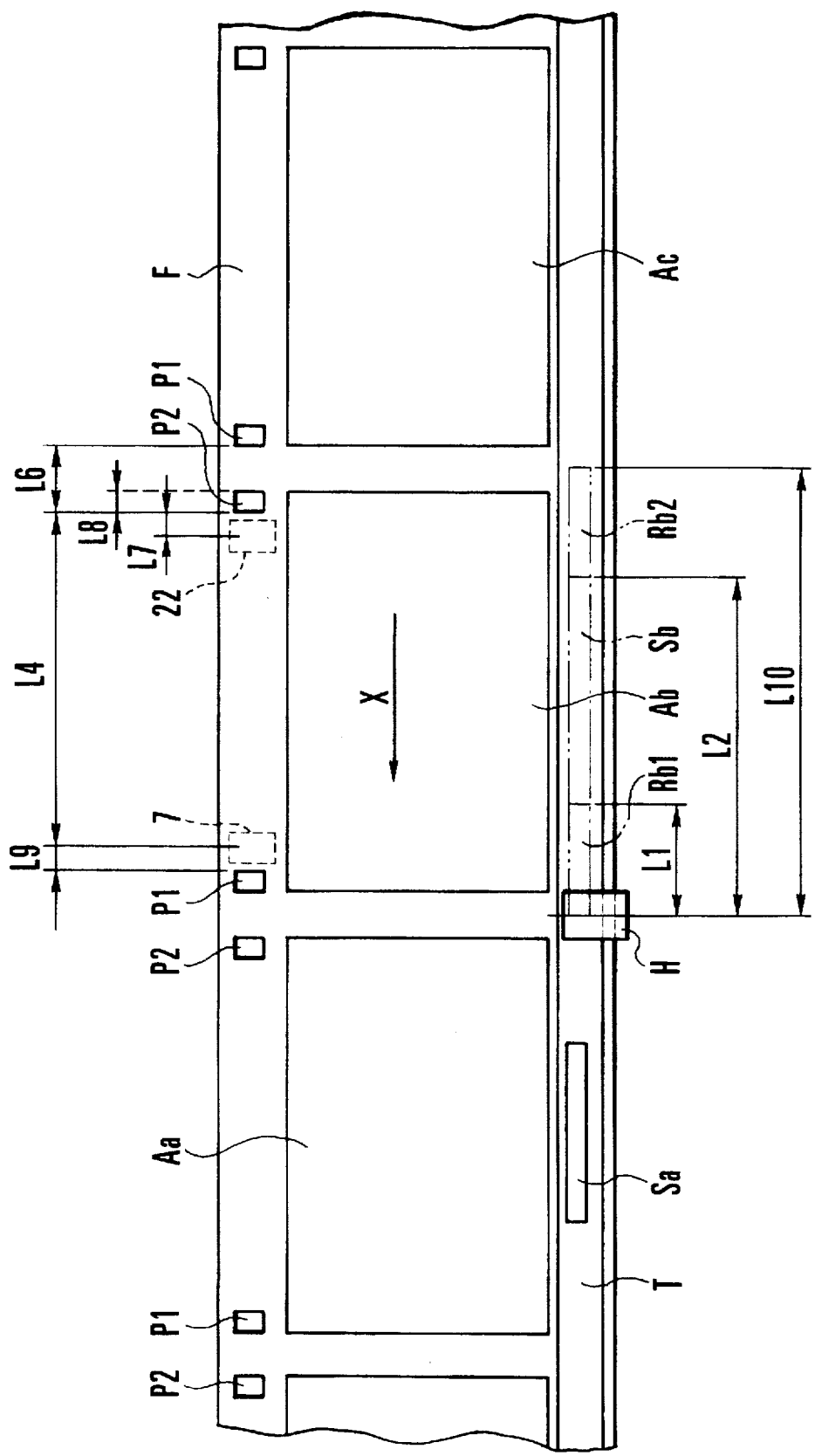
FIG. 3 is a view aiding to explain magnetic recording and magnetic re-recording to be performed by the first embodiment of the invention.

FIG. 3 shows a relation between the film F and the photo-reflectors 7 and 22. In FIG. 3, reference symbol Aa denotes a shooting picture plane already used for shooting. Reference symbol Ab denotes a shooting picture plane to be next used for shooting. Reference symbol Ac denotes a shooting picture plane to be used after the shooting picture plane Ab. Reference symbol T denotes the above-stated magnetic recording part of the film F. Reference symbol Sa denotes an area in which photographic information such as a shutter time, etc., or a shooting date, or the like has been recorded by the magnetic head H when the shooting picture plane Aa already used for shooting has been wound up. Reference symbol Sb is an area which is to be next used for recording by the magnetic head H. An arrow X denotes the direction in which the film F is to be moved and wound up.

Figure 4:
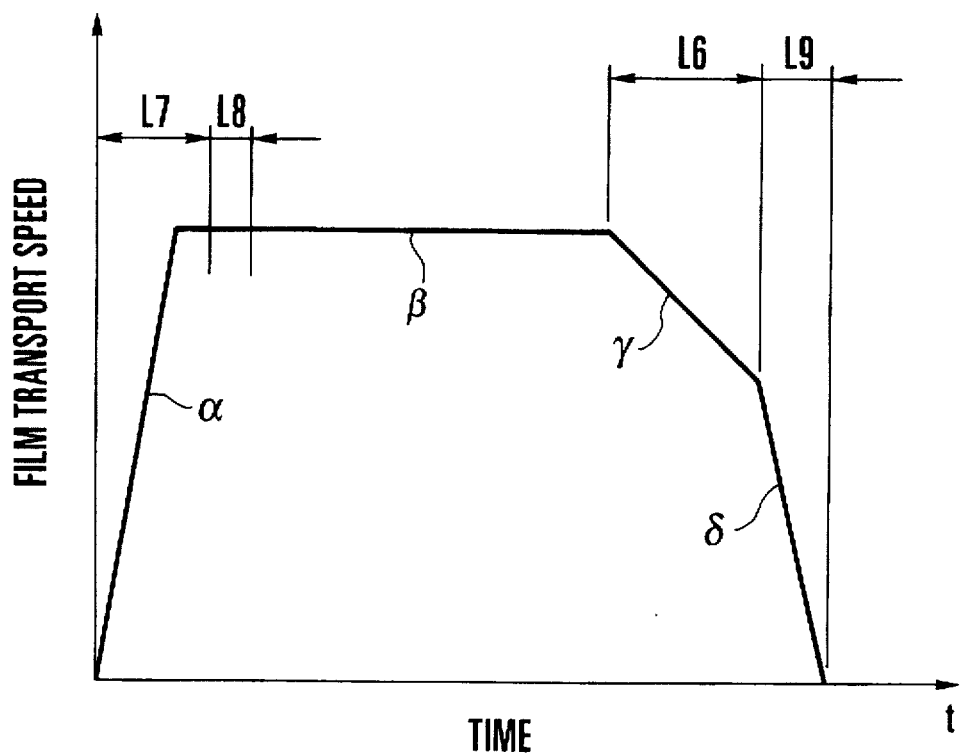
FIG. 4 shows a relationship between the recording time of a magnetic head and the film transport speed in the first embodiment of the invention.

FIG. 4 shows the speed of transporting the film in relation to time. In FIG. 4, distances L6 to L9 respectively correspond to distances L6 to L9 which are shown in FIG. 3. The details of the relation will become apparent from description of operation given hereinafter.

The operation of the control circuit 19 is next described with reference to FIG. 5 which is a flow chart. The flow of operation begins from a step 102 after a step 101. At the step 102, a check is made for the state of a back lid switch (not shown) to find if a back lid is closed to turn on the back lid switch after the camera is loaded with the film cartridge C. If so, the flow comes to a step 103. At the step 103, the motor driver 28 is caused to drive the film transport motor 8. The film F then begins to be wound up by an automatic loading action.

At a step 104, a check is made to find if the first frame of the film F has reached a predetermined position (aperture position), by counting the number of frame portions of the film F on the basis of the output of the photo-reflector 7. If so, the flow proceeds to a step 105. At the step 105, the film transport action comes to a stop by stopping the film transport motor 8 from driving. At a step 106, a check is made to find if the switch SW1 is in an on-state. If not, the flow comes to a step 111. If so, the flow proceeds to a step 107.

At the step 107, the light measuring sensor 4 and the distance measuring sensor 6a are driven to obtain information on measured-light and measured-distance (object distance) values. At a step 108, a check is made to find if the switch SW2 has been turned on. If not, the flow comes back to the step 107. If so, the flow proceeds to a step 109. At the step 109, an exposure action is performed in a known manner.

In brief, the exposure action is carried out as follows. The control circuit 19 receives a lens position signal from the lens encoder 2b through the lens actuator 2a. A stop instruction is given to the lens actuator 2a when the photo-taking lens 1 comes to a position which corresponds to object distance data obtained by the step 107. A driving action on the photo-taking lens 1, i.e., a focusing action, is brought to a stop. At about the same time as this, a shutter opening-and-closing action is performed on the shutter 3 for a period of time decided on the basis of the output of the light measuring sensor 4 obtained by the step 107. The shutter time and the aperture value obtained at this time are stored in the RAM 21. While a shot is taken, in actuality, on the shooting picture plane Aa of the first frame by the exposure, the following description is given on the assumption that the shot has been taken by using the shooting picture plane Ab for the sake of expediency.

At a step 110, a "magnetic recording" subroutine is executed, i.e., the information which has previously been stored in the RAM 21 is recorded in the magnetic recording part T of the film F in accordance with a predetermined magnetic recording method during the transportation of the film F. Then, one frame portion of the film F is wound up and the film F is stopped from being transported.

At a step 111, a check is made to find if the modifying switch 30 which is provided for giving an instruction for modifying recorded information is in an on-state. If so, the flow proceeds to a step 112. If not, the flow comes to a step 115.

At the step 112, the modified information is inputted. The details of this action are as follows.

The control circuit 19 causes the display means 34 to make a display of a question reading, for example, "Do you wish to modify the number of copies to be printed?" If the operator wishes to modify it on seeing the display, the operator turns on the Yes switch 31. If not, the operator turns on the No switch 32.

When the Yes switch 31 is turned on, the control circuit 19 causes the display means 34 to display the set number of printing copies according to the information stored in the RAM 21. The operator then turns on the Yes switch 31 to an extent corresponding to a desired amount of increment if the operator wishes to increase the number of printing copies or turns on the No switch 32 to an extent corresponding to a desired amount of decrement if the operator wishes to decrease the number of printing copies. The control circuit 19 then causes the display means 34 to display the increased or decreased number of printing copies. When the number of printing copies is finally decided, the operator turns on the OK switch 33.

Next, each item to be modified is displayed on the display means 34 and a setting operation is performed by the operator in the same manner as mentioned above. When the item is modified, the control circuit 19 causes the display means 34 to display the modified information. After confirmation of the modification, the operator turns on the Yes switch 31 or the No switch 32. If the Yes switch 31 is turned on, the control circuit 19 proceeds to a step 113. If the No switch 32 is turned on, the control circuit 19 comes back to the initial item, which is setting the number of printing copies in this instance.

Figure 7:
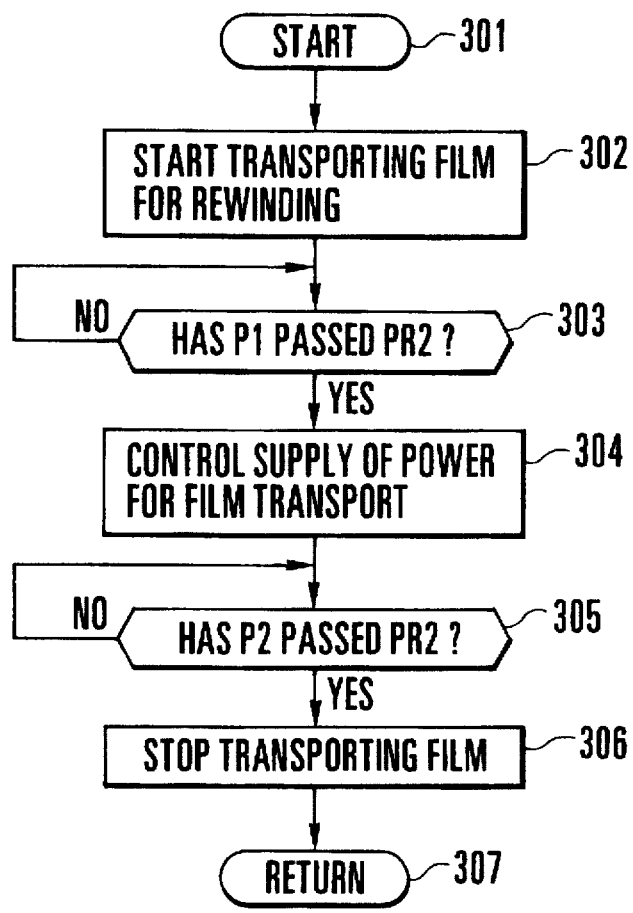
FIG. 7 is a flow chart showing a one-frame rewinding action to be executed by a step 113 of FIG. 5.

At the step 113, although the details of it will be described later with reference to FIG. 7, a "one-frame rewinding" subroutine for rewinding one frame portion of the film F is executed as it is necessary to modify the information recorded. At a step 114, although the details of it will be described later with reference to FIG. 8, a "magnetic re-recording" subroutine is executed to record new magnetic information on the basis of the modified information inputted at the step 112 with a recording current which is sufficiently large to erase the information recorded by the step 110. Further, one frame amount of the film F is wound up also here.

At a step 115, the film F is checked to find if there remains any unexposed picture plane (frames that remain unused for shooting). If so, the flow comes back to the step 106 to be ready for a next shot. If not, the flow proceeds to a step 116. At the step 116, the motor driver 28 is caused to drive the film transport motor 8 in the direction of film rewinding. The film F is rewound. At a step 117, a sequence of actions comes to an end.

Further, while it has not been mentioned, the steps 112, 113 and 114 are on the assumption that the modification is to be made only for one frame amount of information. However, the embodiment may be arranged to modify the information record of any frame that precedes the current frame by a number of frames corresponding to a number of times for which turning-on of the modifying switch 30 is repeated.

Figure 5:
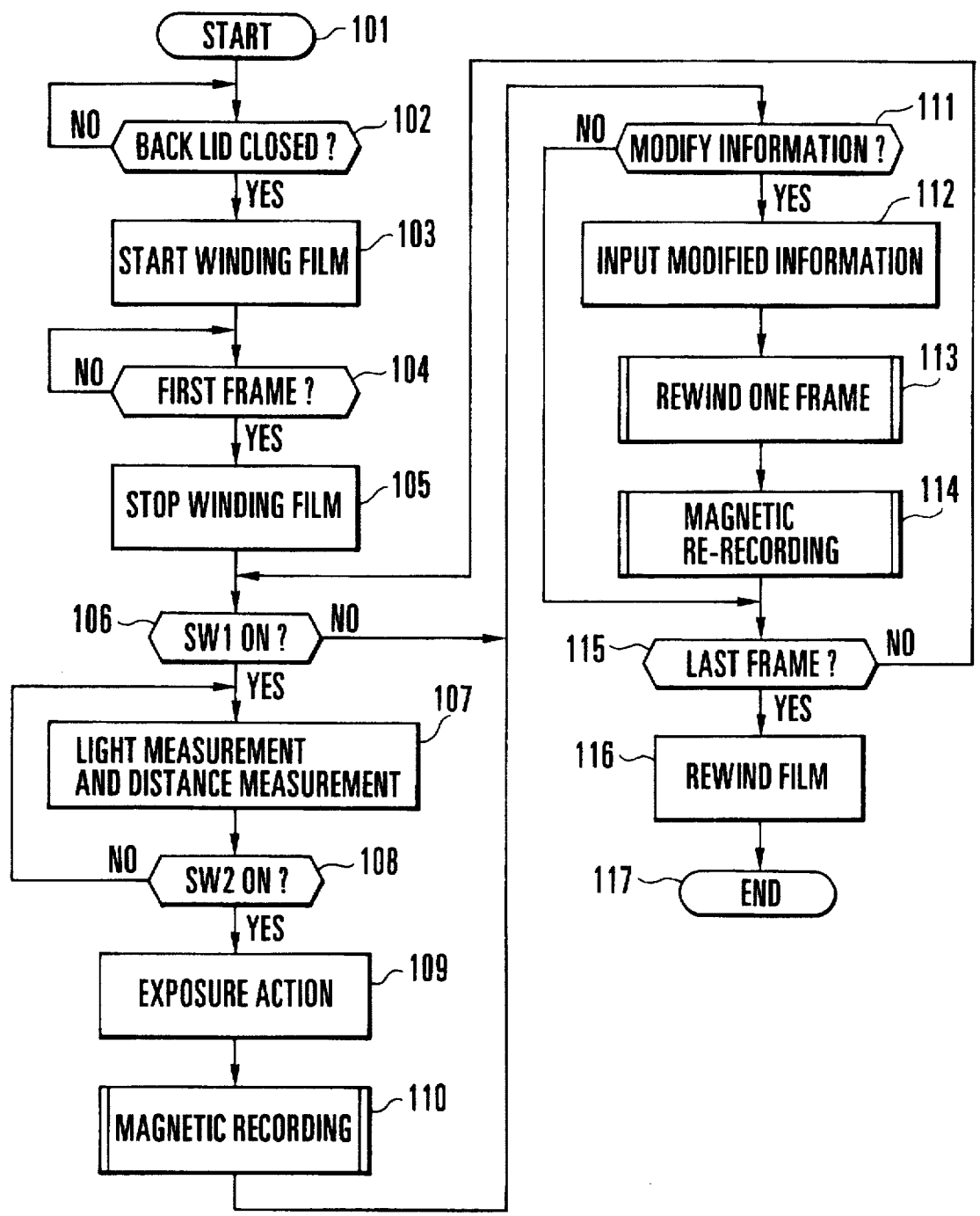
FIG. 5 is a flow chart showing a main operation of the first embodiment of the invention.
Figure 6:
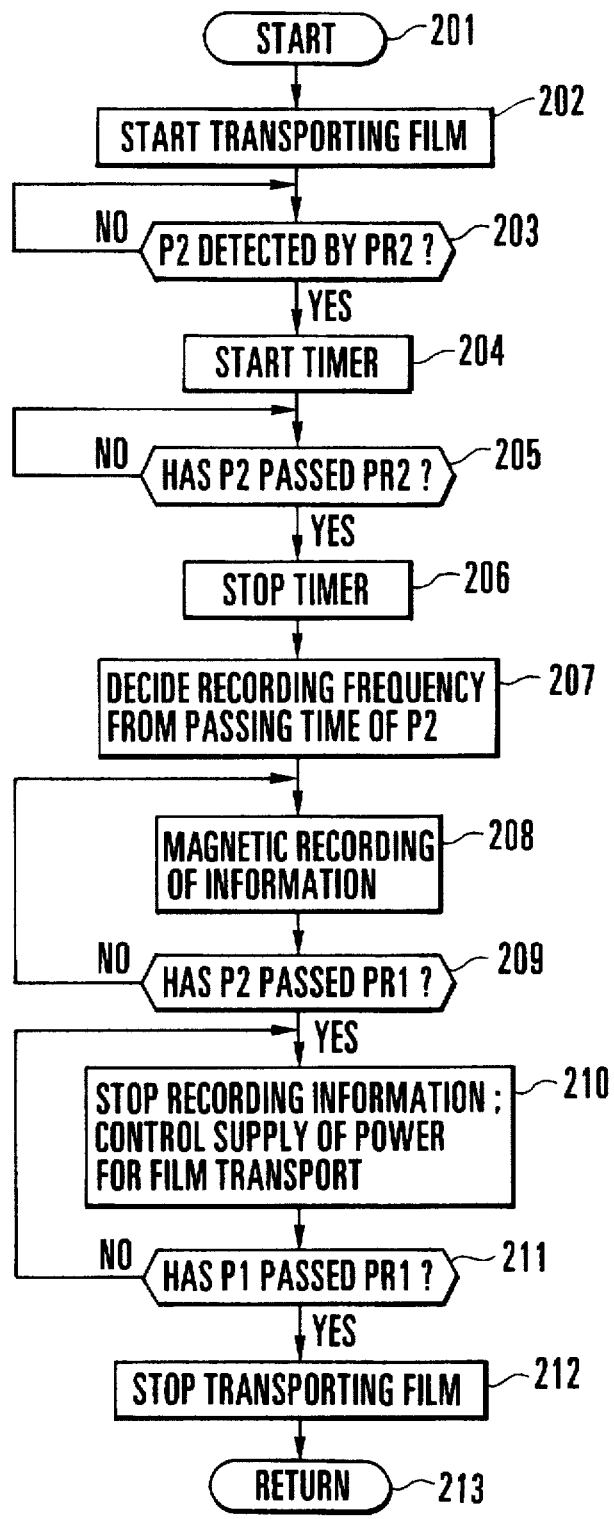
FIG. 6 is a flow chart showing a magnetic recording action to be executed by a step 110 of FIG. 5.

The "magnetic recording" subroutine of the step 110 of FIG. 5 is now described here with reference to the flow chart of FIG. 6. Referring to FIG. 6, the subroutine begins at a step 202 after a step 201.

At the step 202, the motor driver 28 is caused to drive the film transport motor 8 to start winding the shooting picture plane Ab (one frame winding). By this, the film F is transported in the direction of arrow X of FIG. 3. In this instance, the magnetic head H is pressed against the film F. At a step 203, a check is made to find if the perforation P2 which is one of perforations P1 and P2 provided for the shooting picture plane Ab has reached the position of the photo-reflector 22, which is abbreviated to PR2 in the flow chart. If so, the flow proceeds to a step 204. The above-stated words "- - has reached - - -" as used in the present specification means a state in which the edge part of the perforation has come to the center position of the photo-reflector 22 as shown in FIG. 13(a). After the commencement of film winding, when the perforation P2 of the film F has come to the center position of the photo-reflector 22, that is, when the film F has been moved a distance L7 (see FIG. 3), the film transport speed is assumed to have become constant (see an area α of FIG. 4), and the flow proceeds to the next step 204.

At the step 204, an internal timer of the control circuit 19 is started. At a step 205, a check is made to find if the perforation P2 which is one of the perforations P1 and P2 provided for the shooting picture plane Ab has passed the position of the photo-reflector 22. If so, the flow proceeds to a step 206. The above-stated words "- - - has passed - - -" as used herein means that the perforation has moved from the reached position to a position which is shown in FIG. 13(b).

At the step 206, the internal timer is stopped from operating. At a step 207, a count value of the internal timer is checked. In other words, a time interval which corresponds to moving to the extent of the width of the perforation P2 of the shooting picture plane Ab (which corresponds to a distance L8 of FIG. 3) is measured. Then, a recording frequency at which the magnetic head H records information is decided according to the time interval measured. The recording frequency is set at a low value if the film transport speed is slow and at a high value if the film transport speed is fast, thereby making the number of recording bits per unit distance constant.

At a step 208, the magnetic head H is driven to record, through the head amplifier 25, in the area Sb of the magnetic recording part T, data of varied kinds such as a shutter time, an aperture value, etc., stored in the buffer 24. In this recording method, for example, a plurality of the binary digits "0" are recorded to indicate the start and the end of the recording.

At a step 209, a check is made to find if the perforation P2 corresponding to the shooting picture plane Ab has passed the position of the photo-reflector 7 which is abbreviated to PR1 in the flow chart. If not, the flow comes back to the step 208 to continue the information recording until the perforation P2 passes the photo-reflector 7 (PR1). When the perforation P2 passes the photo-reflector 7, the flow comes to a step 210 to bring the information recording to a stop at once by stopping the driving action on the magnetic head H.

An amount of information corresponding to a distance L4 shown in FIG. 3 is thus recorded. By virtue of these steps, the information is recorded accurately in position within the area Sb (without deviating into a next shooting picture plane. The accuracy of the recording position is important, for example, in reproducing the information within the area Sb by a developing machine. Further, since there is some error in mounting the photo-reflector 22 and the magnetic head H, the recording must be made within a distance shorter than the area Sb to absorb the mounting error. Further, at the step 210, the state of supplying power to the film transport motor 8 is changed through the motor driver 28. More specifically, the film transport speed is lowered in preparation for a stop by changing a duty or a voltage (see an area γ shown in FIG. 4). At a step 211, a check is made to find if the perforation P1 corresponding to another shooting picture plane Ac has passed the position of the photo-reflector 7. If so, the flow proceeds to a step 212.

At the step 212, the process of winding the film F is brought to a stop by causing the motor driver 28 to stop the film transport motor 8 from driving. In this instance, the film transportation cannot be brought to a stop instantaneously. As a result, the film F is moved a little further by a certain distance L9 as indicated at an area δ of FIG. 4. The shooting picture plane Ac thus comes to the aperture position. Then, after the lapse of a period of time sufficiently long to have the film F come to a stop, the magnetic head H is detached from the film F.

Next, the "one frame rewinding" subroutine which is executed at the step 113 of FIG. 5 as described above is described in detail with reference to the flow chart of FIG. 7. Referring to FIG. 7, the subroutine begins from a step 302 after a step 301. At the step 302, the motor driver 28 is caused to drive the film transport motor 8 to move the film F in the direction opposite to the direction of arrow X shown in FIG. 3. At a step 303, a check is made to find if the perforation P1 for the shooting picture plane Ac has been caused by the one-frame film winding to pass the photo-reflector 22. If so, the flow proceeds to a step 304. At the step 304, the motor driver 28 is caused to change the state of supplying power to the film transport motor 8. More specifically, the film transport speed is slowed down in preparation for a stop by changing the duty or lowing the voltage.

At a step 305, a check is made to find if the perforation P2 for the shooting picture plane Ab has passed the photo-reflector 22. If so, the flow proceeds to a step 306. At the step 306, the motor driver 28 is caused to stop the film transport motor 8 from driving. The embodiment is thus brought back to a state obtained before the one-frame film winding is performed.

Figure 8:
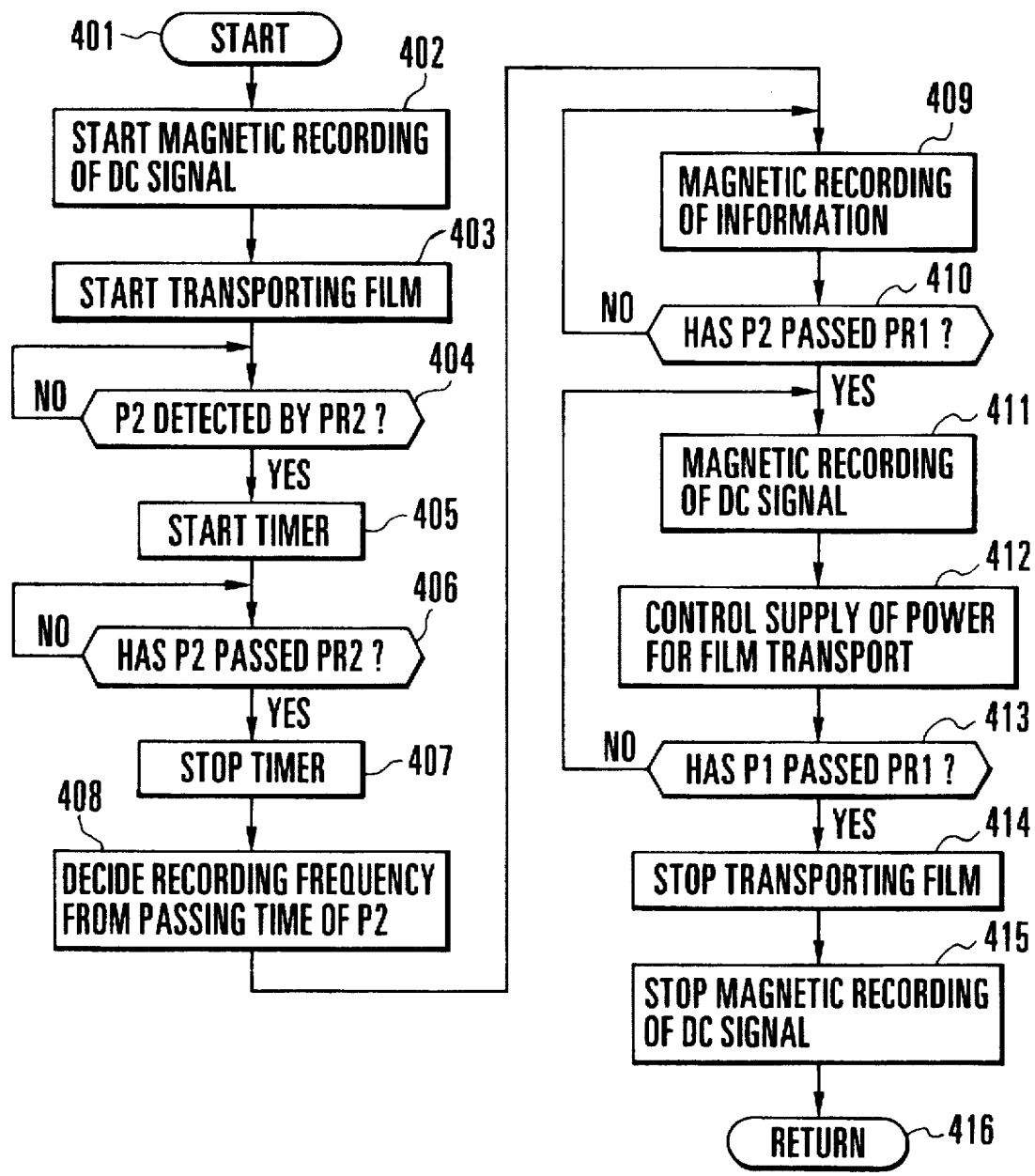
FIG. 8 is a flow chart showing a magnetic re-recording action to be executed by a step 114 of FIG. 5.

The "magnetic re-recording" subroutine executed by the step 114 of FIG. 5 is now described in detail with reference to the flow chart of FIG. 8. Referring to FIG. 8, the subroutine begins at a step 402 after a step 401.

At the step 402, the magnetic head H is pressed against the film F. A DC signal is applied to the magnetic head H via the head amplifier 25 in the direction of supplying power determined beforehand. With the DC signal applied to pass through the magnetic head H, the information recorded in the magnetic recording part T of the film F is erased. At a step 403, the motor driver 28 is caused to drive the film transport motor 8 to begin winding up the shooting picture plane Ab (one-frame film winding). The film F is thus transported in the direction of arrow X as shown in FIG. 3. (The shooting picture plane Ab is assumed to be now in the aperture position).

At the step 404, a check is made to find if the perforation P2 which is one of the perforations P1 and P2 provided for the shooting picture plane Ab has reached the position of the photo-reflector 22. If so, the flow comes to a step 405. The arrangement is such that the film winding speed is assumed to have become constant when the edge part of of the perforation P2 has come to the center position of the photo-reflector 22, that is, when the film F has been moved a distance L7 as shown in FIG. 3 (see the area α of FIG. 4). The flow then comes to the next step 405.

At the step 405, the internal timer is started to operate. At a step 406, a check is made to find if the perforation P2 which is provided for the shooting picture plane Ab has passed the position of the photo-reflector 22. If so, the flow comes to a step 407 to bring the internal timer to a stop.

At a step 408, a count value of the internal timer is checked. In other words, a time interval during which the film F moves as much as the width of the perforation P2 (corresponding to a distance L8 of FIG. 3) is measured. A recording frequency at which information is to be recorded by the magnetic head H is decided according to the time interval thus measured. This step is provided for making the number of recording bits per unit distance constant, by setting the recording frequency low if the film transport speed is slow and high if the film transport speed is fast. By then, the DC signal is recorded in a magnetic recording area Rb1 of the magnetic recording part T shown in FIG. 3 (an area over which the film has been moved). In other words, if there has been any existing record of information in this area Rb1, the existing record is erased without fail by the DC signal.

At a step 409, the magnetic head H is driven to begin recording data of varied kinds such as a shutter speed, an aperture value, etc., stored in the buffer 24 and obtained through the head amplifier 25. In this recording method, for example, a plurality of binary bits "0" is recorded to indicate the start and the end of the recording like in the case of the step 110 of FIG. 5.

At a step 410, a check is made to find if the perforation P2 provided for the shooting picture plane Ab has passed the position of the photo-reflector 7. If not, the flow comes back to the step 409 to continue recording the information. Upon completion of the information recording, the magnetic head H is again energized in the same direction as in the case of the step 402. After that, when the perforation P2 is found to have passed the position of the photo-reflector 7, the flow comes to a step 411. At the step 411, the magnetic head H is again energized in the same direction as at the step 402.

At a step 412, the motor driver 28 is caused to change the state of supplying power to the film transport motor 8. More specifically, the duty is changed or the voltage is lowered to slow down the film transport speed in preparation for a stop (an area γ of FIG. 4). At a step 413, a check is made to find if the perforation P1 provided for the shooting picture plane Ac has passed the position of the photo-reflector 7. If not, the flow comes back to the step 411 to repeat the above-stated action. After that, when the perforation P1 is found to have passed, the flow proceeds to a step 414. At the step 414, the film winding action is brought to a stop by causing the motor driver 28 to stop the film transport motor 8 from driving. The film F then does not come to a stop at once but is a moved a little further to an extent as indicated by the distance L9 and as shown at the area δ in FIG. 4. As a result, the shooting picture plane Ac comes to the aperture position. At a step 415, the supply of the DC signal to the magnetic head H is brought to a stop, and the magnetic head H is detached from the film F.

Consequently, the information previously recorded in the magnetic recording part T of one frame portion of the film is thus erased, and new information is recorded within the area Sb of the frame. Further, a DC signal is recorded in other areas Rb1 and Rb2.

Figure 9:
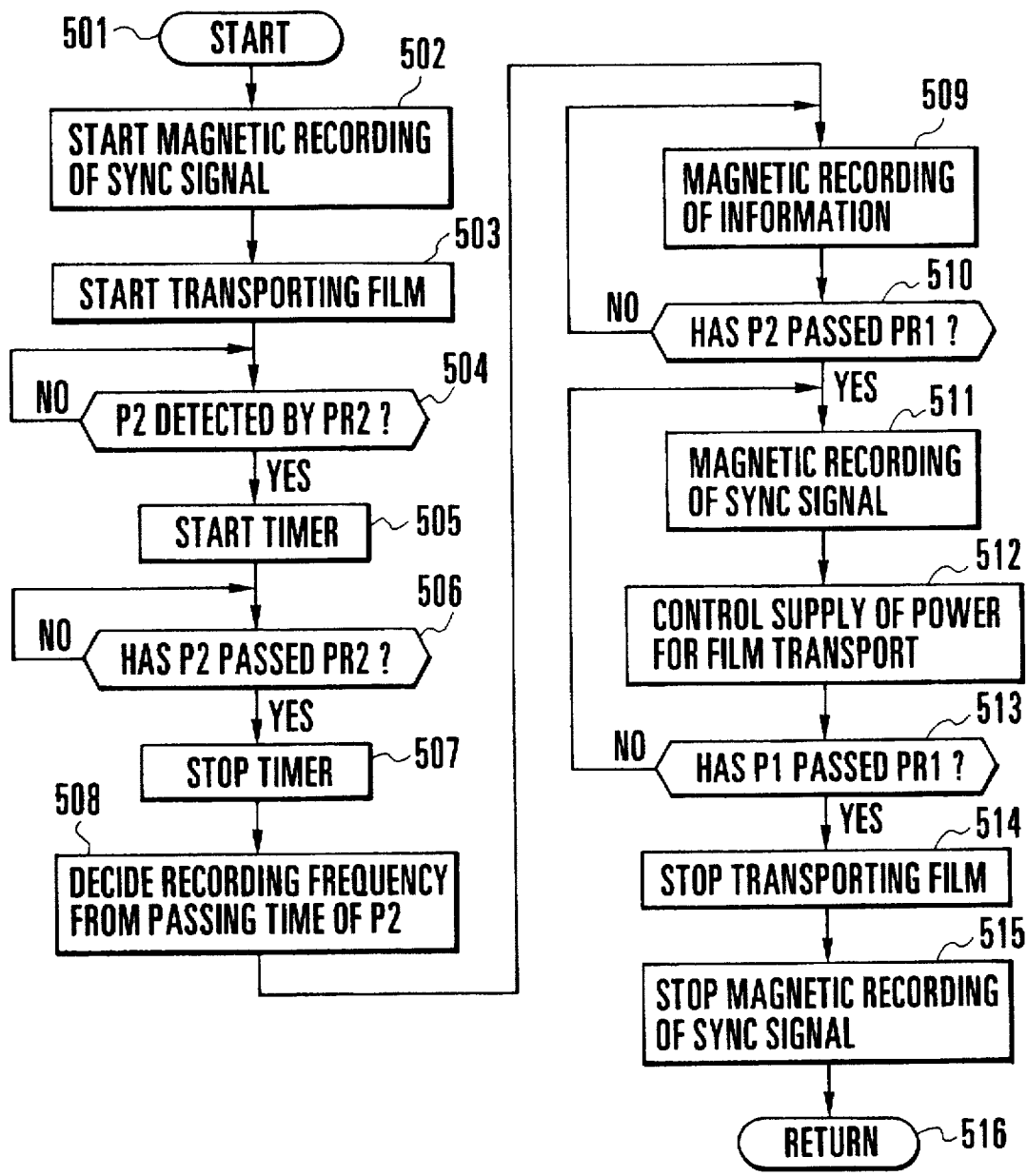
FIG. 9 is a flow chart showing a magnetic re-recording action of a second embodiment of the invention.

FIG. 9 shows in a flow chart a "magnetic re-recording" subroutine to be executed by a second embodiment of the invention, which flow chart corresponds to FIG. 8 in the first embodiment. The arrangement of the second embodiment, such as its circuit arrangement, etc., is identical with that of the first embodiment. The details of the component parts of the second embodiment are therefore omitted from description. The operation of the second embodiment is, therefore, described below with reference to FIGS. 1 to 4 in addition to the flow chart of FIG. 9.

While the first embodiment is arranged to erase information by means of a DC signal, the second embodiment is arranged to carry out this action with a sync signal which is arranged to indicate the start and the end of information recording.

At a step 502, the magnetic head H is pressed against the film F. Then, a sync signal consisting of predetermined, continuous binary digits "0" is applied to the magnetic head H through the head amplifier 25. The sync signal is arranged in this manner because signals indicating the start and the end of information are identical with each other and, therefore, are never erroneously reproduced. At a photofinishing laboratory, the sync signal will never be processed by mistaking it for data even if it is read out from the film F. When the energizing current of the sync signal is allowed to flow, the current effectively erases the information recorded in the magnetic recording part T on the film F which passes the magnetic head H.

At a step 503, the motor driver 28 is caused to drive the film transport motor 8 to begin winding up the shooting picture plane Ab (one-frame winding). The film F is transported in the direction of arrow X of FIG. 3. At a step 504, a check is made to find if the perforation P2 which is one of the perforations P1 and P2 provided for the shooting picture plane Ab has reached the position of the photo-reflector 22. If so, the flow proceeds to a step 505. In other words, the flow proceeds to the next step on the assumption that the film winding speed has become constant by the time when the perforation P2 has come to pass the photo-reflector 22 after the commencement of winding the film F, i.e., when the film F has been moved a distance L7 (see FIG. 3) as shown at the area α in FIG. 4.

At the step 505, the internal timer is started to operate. At a step 506, a check is made to find if the perforation P2 which is provided for the shooting picture plane Ab has passed the position of the photo-reflector 22. If so, the flow proceeds to a step 507. At the step 507, the internal timer is brought to a stop.

At a step 508, a count value of the internal timer is checked. In other words, a time interval during which the film F moves to a distance which is equal to the width of the perforation P2 of the shooting picture plane Ab (corresponds to a distance L8 shown in FIG. 3) is measured. Then, a recording frequency at which information is to be recorded by the magnetic head H is decided on the basis of the time interval thus measured. This step is provided for making the number of recording bits per unit distance constant, by lowering the recording frequency when the film transport speed is slow and by increasing it when the film transport speed is fast.

At a step 509, the magnetic head H is driven to record data of varied kinds such as a shutter time, an aperture value, etc., stored in the buffer 24 through the head amplifier 25. The data is recorded after a plurality of binary digits "0", for example, are recorded for the purpose of indicating the start and the end of recording.

At a step 510, a check is made to find if the perforation P2 for the shooting picture plane Ab has passed the position of the photo-reflector 7. If not, the flow comes back to the step 509 to continue the recording of information. Upon completion of the information recording, the magnetic head H is again energized in the same direction as in the case of the step 502. After that, when the perforation P2 is found to have passed the photo-reflector 7, the flow proceeds to a step 511.

At the step 511, again, the sync signal is applied to the magnetic head H in the same manner as in the case of the step 502. At a step 512, the motor driver 28 is caused to change the state of supplying power to the film transport motor 8. More specifically, the film transport speed is lowered in preparation for a stop by changing the duty or by lowering the voltage (see the area γ of FIG. 4). At a step 513, a check is made to find if the perforation P1 which is provided for the shooting picture plane Ac has passed the position of the photo-reflector 7. If not, the flow comes back to the step 511 to repeat the same action. After that, when the perforation P1 is found to have passed the photo-reflector 7, the flow proceeds to a step 514.

At the step 514, the motor driver 28 is caused to stop the film transport motor 8 from driving and to bring the film winding action to a stop. The film F in this instance does not come to a stop at once but is moved a little further by a distance L9 as shown at an area δ in FIG. 4. By this, the shooting picture plane Ac comes to the aperture position. At a step 515, the sync signal is stopped from being applied to the magnetic head H, and the magnetic head H is detached from the film F.

Through these steps, the information previously recorded in the magnetic recording part T within one frame portion of the film F is erased. New information is recorded there with the sync signal also recorded in the area other than where the new information is recorded. While the sync signal is recorded in this case, some other signal that prevents erroneous reproduction may be recorded in place of it.

Figure 10:
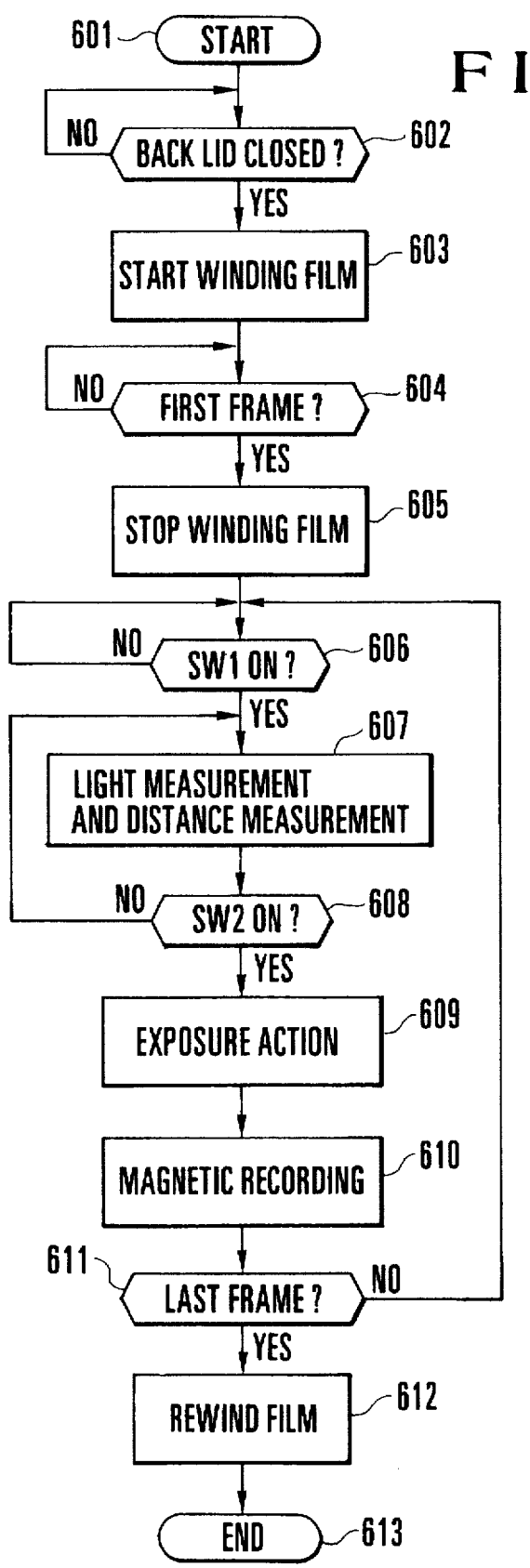
FIG. 10 is a flow chart showing a main operation of a third embodiment of the invention.
Figure 11:
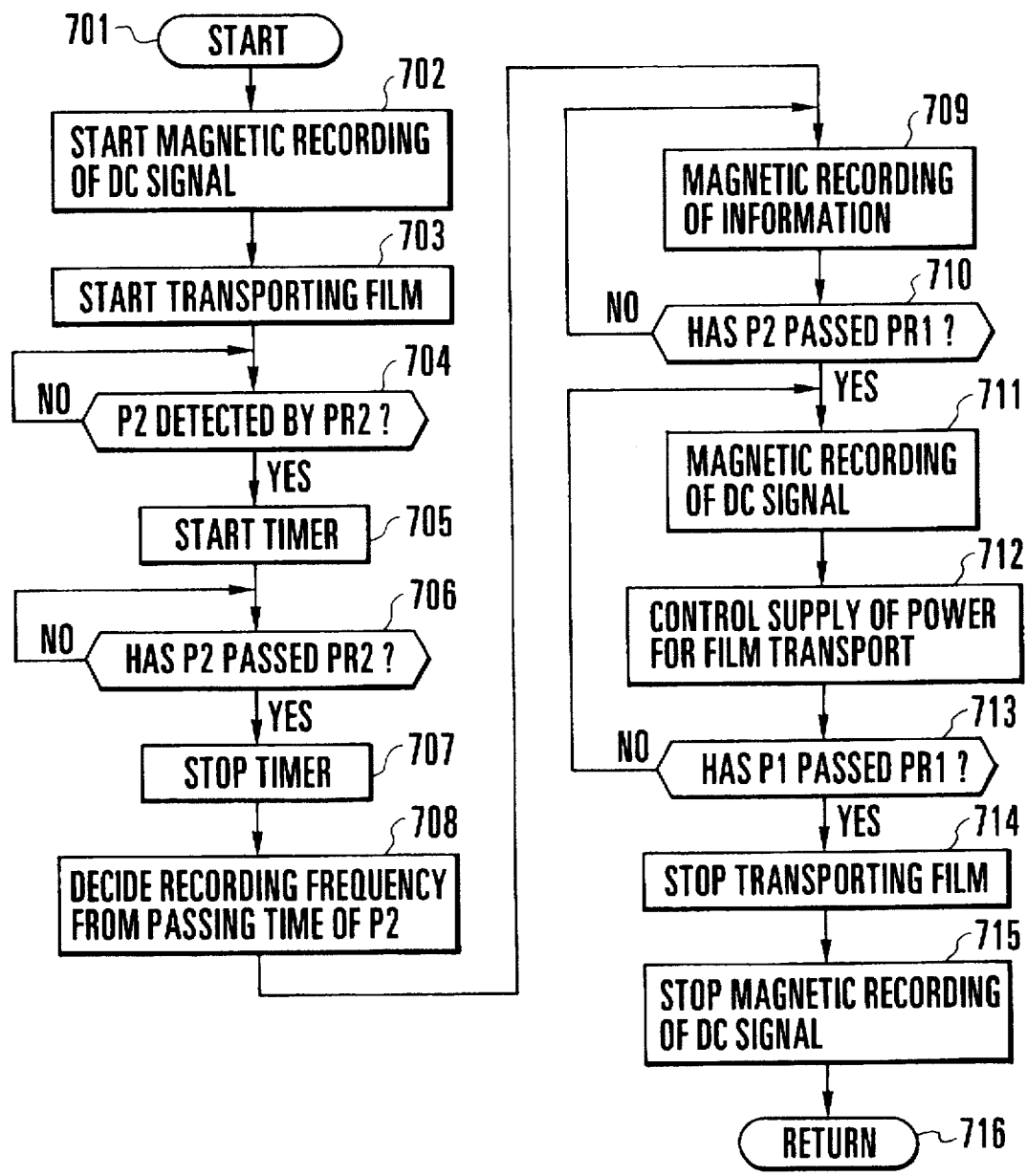
FIG. 11 is a flow chart showing a magnetic recording action of the third embodiment of the invention.

FIGS. 10 and 11 are flow charts according to a third embodiment of the invention. These flow charts correspond to FIGS. 5 and 6. The third embodiment has the same circuit arrangement as the first embodiment. The following description of operation of the third embodiment is, therefore, given with reference to FIGS. 1 to 4 in addition to the flow charts of FIGS. 10 and 11.

Unlike the embodiments described above, the third embodiment is arranged to continuously record information while the film is in process of transportation and even when the film is not in process of re-recording. In other words, when the data recording is not performed while the film is in process of transportation, a DC signal is applied to the magnetic head H to carry out recording in the same manner as in the case of the "magnetic re-recording" of the first embodiment.

At a step 602 of FIG. 10, a check is made to find if a back lid switch (not shown) has been turned on by closing a back lid with the camera loaded with a film cartridge C. If the back lid switch is found to have been turned on, the flow of operation proceeds to a step 603. At the step 603, the motor diver 28 is caused to drive the film transport motor 8 to begin the action of winding up the film F (automatic loading). At a step 604, the number of frames fed by the motor 8 is counted from the output of the photo-reflector 7. A check is made to find if the first frame portion of the film F has reached a predetermined position (the aperture position). If so, the flow proceeds to a step 605.

At the step 605, the film winding action is brought to a stop by stopping the film transport motor 8 from driving. At a step 606, a check is made to find if the switch SW1 is in an on-state. If so, the flow comes to a step 607. At the step 607, the light measuring sensor 4 and the distance measuring sensor 6a are driven to obtain information on a measured light value and a measured (object) distance value. At a step 608, a check is made to find if the switch SW2 has been turned on. If not, the flow comes back to the step 607. If so, the flow proceeds to a step 609. At the step 609, an exposure action is performed in a known manner.

The exposure action is briefly described as follows. The control circuit 19 receives a lens position signal from the lens encoder 2b via the lens actuator 2a. A stop instruction is given to the lens actuator 2a when the photo-taking lens 1 comes to a position corresponding to object distance data obtained by the step 607. The lens actuator 2a is stopped from driving, i.e., from doing a focusing action. At about the same time, the shutter 3 is caused to open and close for a period of time decided according to the output of the light measuring sensor 4 by the step 607. The shutter time and the aperture value used then are stored in the RAM 21.

Further, although a shot is thus taken on the first shooting picture plane Aa of FIG. 3 in actuality, the shot is assumed to have been taken on the shooting picture plane Ab for the sake of expediency in relation to the following description.

At a step 610, a "magnetic recording" subroutine is executed according to a predetermined magnetic recording method to record, in the magnetic recording part T of the film F, the information stored in the RAM 21 when the film is transported (at the time of film feeding). Then, one frame portion of the film F is wound up and the film transport action comes to a stop. The details of this will be described later with reference to FIG. 11.

At a step 611, a check is made for any picture plane remaining unused for shooting (any remaining frame). If there is any unused picture plane on the film F, the flow comes back to the step 606 for a next shot. If not, the flow proceeds to a step 612. At the step 612, the film F is rewound by causing the motor driver 28 to drive the film transport motor 8 in the direction of rewinding. At a step 613, a series of actions comes to an end.

The following describes, with reference to FIG. 11, the details of the "magnetic recording" subroutine executed at the above-stated step 610. This subroutine is called when a magnetic recording mode, etc., are set and begins at a step 702 after a step 701.

At the step 702, the magnetic head H is pressed against the film F, and a DC signal is applied to the magnetic head H via the head amplifier 25 to flow in a predetermined direction. With a DC current thus allowed to flow through the magnetic head H, the information which has been recorded in the magnetic recording part T of the film F is erased. At a step 703, the motor driver 28 is caused to drive the film transport motor 8 to begin winding the shooting picture plane Ab (one frame winding). The film F is thus transported in the direction of arrow X shown in FIG. 3. At a step 704, a check is made to find if the perforation P2 which is one of the perforations P1 and P2 provided for the shooting picture plane Ab has reached the position of the photo-reflector 22. If so, the flow of operation proceeds to a step 705. At the step 705, the internal timer is started. At a step 706, a check is made to find if the perforation P2 for the shooting picture plane Ab has passed the position of the photo-reflector 22. If so, the flow proceeds to a step 707. At the step 707, the internal timer is stopped from operating.

At a step 708, a recording frequency at which information is to be recorded by the magnetic head H is decided on the basis of a count value of the internal timer. At a step 709, the magnetic head H is driven to begin recording data of varies kinds such as a shutter time, an aperture value, etc., stored in the buffer 24 through the head amplifier 25. At a step 710, a check is made to find if the perforation P2 provided for the shooting picture plane Ab has passed the position of the photo-reflector 7. If not, the flow comes back to the step 709 to continue the information recording before the perforation P2 comes to pass the photo-reflector 7. If the information to be recorded comes to an end, the magnetic head H is again energized in the same direction as in the case of the step 702. After that, when the perforation P2 comes to pass the photo-reflector 7, the flow proceeds to a step 711. At the step 711, the driving action on the magnetic head H is stopped to bring the information recording to a stop at once. The magnetic head H is then energized again in the same direction as in the step 702.

At a step 712, the motor driver 28 is caused to change the state of supplying power to the film transport motor 8. More specifically, the film transport speed is slowed down by changing a duty or by lowering a voltage in preparation for a stop (the area γ of FIG. 4).

At a step 713, a check is made to find if the perforation P1 which is provided for the shooting picture plane Ac has passed the position of the photo-reflector 7. If not, the flow comes back to the step 711. If so, the flow proceeds to a step 714. At the step 714, the motor driver 28 is caused to drive the film transport motor 8 to bring the film winding to a stop. By this step, the shooting picture plane Ac is brought to the aperture position.

At a step 715, the DC energizing action on the magnetic head H is brought to a stop, and the magnetic head H is detached from the film F.

Figure 12:
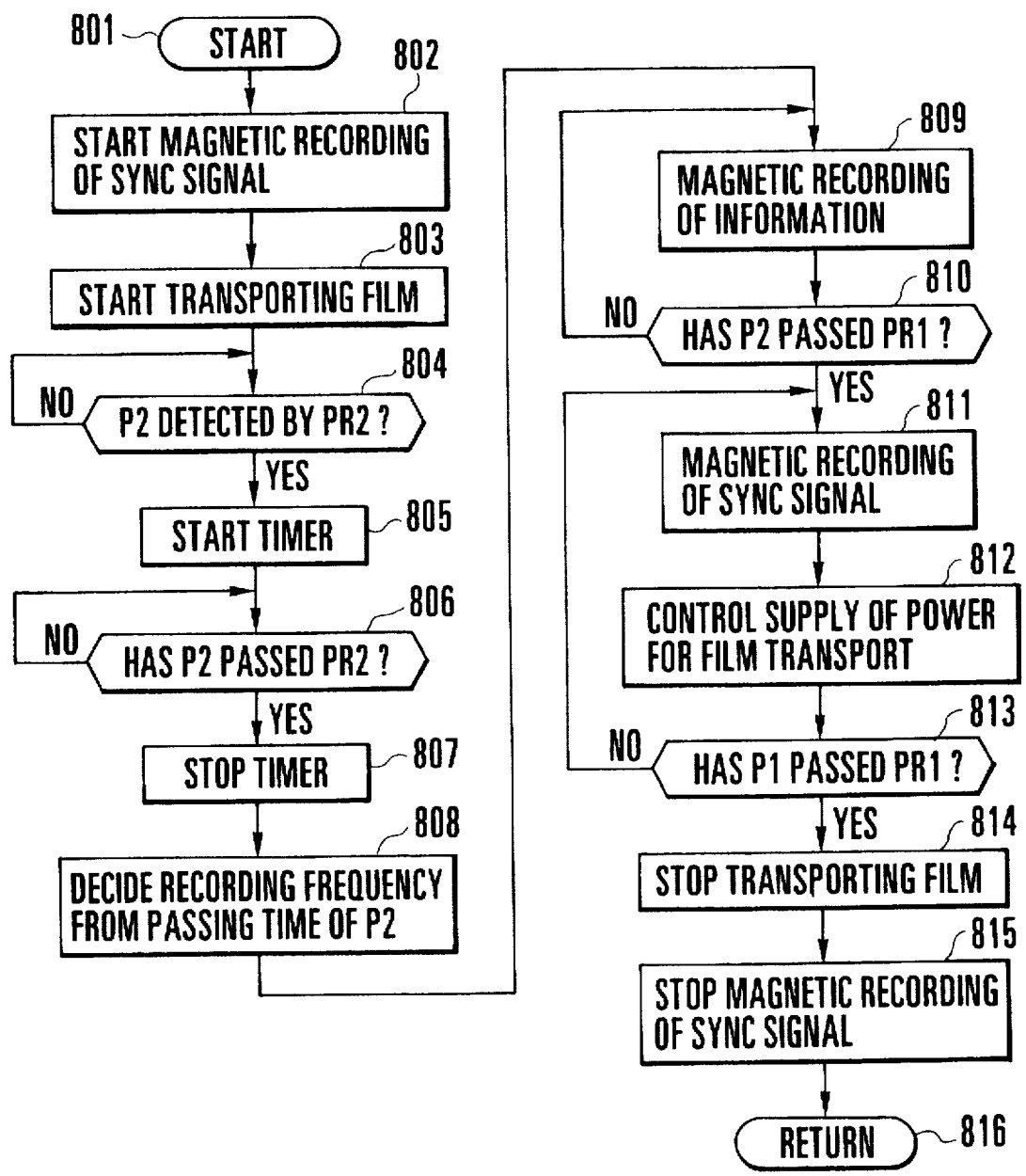
FIG. 12 is a flow chart showing another magnetic recording action of the third embodiment of the invention.

FIG. 12 is a flow chart showing how the "magnetic recording" subroutine is executed by a fourth embodiment of the invention. In the case of the fourth embodiment, the "DC signal" used by the third embodiment shown in FIG. 11 is replaced with use of a sync signal. With the exception of this point, the fourth embodiment is exactly the same as the third embodiment. Therefore, the fourth embodiment requires no further description.

The invention is applicable to any of cameras of varied kinds including a single-lens reflex camera, a lens-shutter camera, a video camera, etc.

Each of the embodiments described is arranged to use a DC signal or a sync signal for erasing a previously recorded data signal. However, a signal of any other type may be employed as the erasing signal as long as it is arranged specifically for erasing data. Further, a signal of such a type that cannot be read out by a developing machine may be employed as the erasing signal.

What is claimed is:

1. A camera arranged to record data in a magnetic recording part provided for each frame part of a film by supplying a data signal to a magnetic head, comprising:

a) a data recording control circuit arranged to supply a predetermined signal and the data signal to the magnetic head;

b) a film transport circuit for transporting the film; and c) a control circuit for starting an operation of said data recording control circuit prior to a start of transport of the film by said film transport circuit.

2. A camera according to claim 1, further comprising film transport position detecting means for detecting a transported position of the film, wherein said data recording control circuit is arranged to supply the predetermined signal to the magnetic head until a predetermined position of a frame part of the film is transported to a predetermined position relative to the magnetic head and to supply the data signal to the magnetic head when the predetermined position of the frame part reaches the predetermined position relative to the magnetic head.

3. A camera according to claim 1, wherein the predetermined signal is a specific signal.

4. A camera according to claim 3, wherein the specific signal is a direct current.

5. A camera arranged to record data in a magnetic recording part provided for each frame part of a film by supplying a data signal to a magnetic head, comprising:

a) data recording control circuit arranged to supply a predetermined signal and the data signal to the magnetic head;

b) a film transport circuit for transporting the film; and c) a control circuit for, when one-frame transport action is effected by said film transport circuit, starting to supply a predetermined signal to the magnetic head by said data recording control circuit prior to a start of transport operation by said film transport circuit.

6. A camera according to claim 5, wherein said data recording control circuit is arranged to operate when each frame part of the film is transported by a one-frame transport action of said film transport circuit.

7. A camera according to claim 5, wherein, when the one-frame transport action is effected by said film transport circuit, said data recording control circuit is arranged to supply the predetermined signal from a point of time after the start of transport of the film until a predetermined position of a frame part of the film is moved to a predetermined position relative to the magnetic head and to supply the data signal when the predetermined position of the frame part reaches the predetermined position relative to the magnetic head.

8. A camera according to claim 6, wherein, when the one-frame transport action is effected by said film transport circuit, said data recording control circuit is arranged to supply the data signal when a predetermined period of time has elapsed after the start of transport of the film and to supply the predetermined signal before the data signal is supplied.

9. A camera arranged to record data in a magnetic recording part provided for each frame part of a film by supplying a data signal to a magnetic head, comprising:

a recording control circuit having a first recording mode in which a signal is recorded on a predetermined range of a magnetic recording part provided for each frame part and a second recording mode in which a re-recording is carried out on a magnetic recording part of a frame part on which a recording has been performed in the first recording mode, for causing, in the second recording mode, a signal to be recorded on a range which is designated as a signal recording range and which is set wider than said predetermined range on which the signal has been recorded in the first recording mode.

10. A camera according to claim 9, wherein said camera has frame position detecting means and a film transport circuit, and supplies a signal, in the first recording mode, to said head starting from the time at which a recording part of a frame is transported to a first position relative to said head until the time at which said recording part of said frame is transported to a second position relative to said head, and supplies a signal, in the second mode, to said head starting from the time prior to the time at which a recording part of a frame is transported to said first position relative to said head until the time at which said recording part of said frame is transported at least to said second position relative to said head.

11. A camera according to claim 9, wherein said recording control circuit causes, in the first recording mode, a data signal to be recorded on said predetermined range and, in the second mode, a data signal associated with two predetermined signals, said data signal, in said second mode, being recorded in said designated signal recording range and located between said two predetermined signal.

12. A camera according to claim 11, wherein the predetermined signal is a specific signal.

13. A camera according to claim 12, wherein the specific signal is a direct current.

14. A magnetic recording apparatus arranged to record data in a magnetic recording part provided for each frame part of a film by supplying a data signal to a magnetic head, comprising:

a) a data recording control circuit arranged to supply a predetermined signal and the data signal to the magnetic head;

b) a film transport circuit for transporting the film; and c) a control circuit for starting an operation of said data recording control circuit prior to a start of transport of the film by said film transport circuit.

15. A magnetic recording apparatus according to claim 14, further comprising film transport position detecting means for detecting a transported position of the film, wherein said data recording control circuit is arranged to supply the predetermined signal to the magnetic head until a predetermined position of a frame part of the film is transported to a predetermined position relative to the magnetic head and to supply the data signal to the magnetic head when the predetermined position of the frame part reaches the predetermined position relative to the magnetic head.

16. An apparatus according to claim 14, wherein the predetermined signal is a specific signal.

17. An apparatus according to claim 16, wherein the specific signal is a direct current.

18. A magnetic recording apparatus arranged to record data in a magnetic recording part provided for each frame part of a film by supplying a data signal to a magnetic head, comprising:

a) data recording control circuit arranged to supply a predetermined signal and the data signal to the magnetic head;

b) a film transport circuit for transporting the film; and c) a control circuit for, when one-frame transport action is effected by said film transport circuit, starting to supply a predetermined signal to the magnetic head by said data recording control circuit prior to a start of transport operation by said film transport circuit.

19. A magnetic recording apparatus according to claim 18, wherein said data recording control circuit is arranged to operate when each frame part of the film is transported by a one-frame transport action of said film transport circuit.

20. A magnetic recording apparatus according to claim 18, wherein, when the one-frame transport action is effected by said film transport circuit, said data recording control circuit is arranged to supply the predetermined signal from a point of time after the start of transport of the film until a predetermined position of a frame part of the film is moved to a predetermined position relative to the magnetic head and to supply the data signal when the predetermined position of the frame part reaches the predetermined position relative to the magnetic head.

21. A magnetic recording apparatus according to claim 19, wherein, when the one-frame transport action is effected by said film transport circuit, said data recording control circuit is arranged to supply the data signal when a predetermined period of time has elapsed after the start of transport of the film and to supply the predetermined signal before the data signal is supplied.

22. An apparatus according to claim 18, wherein the predetermined signal is a specific signal.

23. An apparatus according to claim 22, wherein the specific signal is a direct current.

24. A magnetic recording apparatus arranged to record data in a magnetic recording part provided for each frame part of a film by supplying a data signal to a magnetic head, comprising:

a recording control circuit having a first recording mode in which a signal is recorded on a predetermined range of a magnetic recording part provided for each frame part and a second recording mode in which a re-recording is carried out on a magnetic recording part of a frame part on which a recording has been performed in the first recording mode, for causing, in the second recording mode, a signal to be recorded on a range which is designated as a signal recording range and which is set wider than said predetermined range on which the signal has been recorded in the first recording mode.

25. A magnetic recording apparatus according to claim 24, wherein said apparatus has frame position detecting means and a film transport circuit, and supplies a signal, in the first recording mode, to said head starting from the time at which a recording part of a frame is transported to a first position relative to said head until the time at which said recording part of said frame is transported to a second position relative to said head, and supplies a signal, in the second mode, to said head starting from the time prior to the time at which a recording part of a frame is transported to said first position relative to said head until the time at which said recording part of said frame is transported at least to said second position relative to said head.

26. A magnetic recording apparatus according to claim 24, wherein said recording control circuit causes, in the first recording mode, a data signal to be recorded on said predetermined range and, in the second mode, a data signal associated with two predetermined signals, said data signal, in said second mode, being recorded in said designated signal recording range.

27. A magnetic recording apparatus according to claim 26, wherein the predetermined signal is a specific signal.

28. A magnetic recording apparatus according to claim 27, wherein the specific signal is a direct current.

* * * * *